United States Patent
van Willigenburg et al.

(10) Patent No.: US 9,449,445 B2
(45) Date of Patent: Sep. 20, 2016

(54) WIRELESS COMMUNICATION TECHNIQUES FOR CONTROLLING ACCESS GRANTED BY A SECURITY DEVICE

(75) Inventors: Willem van Willigenburg, Hilversum (NL); Harold Balemans, Eemnes (NL)

(73) Assignee: Alcatel Lucent, Boulogne-Billancourt (FR)

( * ) Notice: Subject to any disclaimer, the term of this patent is extended or adjusted under 35 U.S.C. 154(b) by 2548 days.

(21) Appl. No.: 12/072,678

(22) Filed: Feb. 27, 2008

(65) Prior Publication Data

US 2008/0207171 A1    Aug. 28, 2008

(51) Int. Cl.
 *H04M 1/66* (2006.01)
 *G07C 9/00* (2006.01)
 *H04W 12/08* (2009.01)

(52) U.S. Cl.
 CPC ....... *G07C 9/00111* (2013.01); *G07C 9/00103* (2013.01); *H04W 12/08* (2013.01); *G07C 9/00039* (2013.01)

(58) Field of Classification Search
 CPC ... H04W 12/06; H04W 12/04; H04W 12/08; H04W 4/008; H04W 4/02; H04M 1/667; H04M 1/67
 USPC ......... 455/458, 436, 414.1, 439, 445, 456.1, 455/410, 411, 558, 550.1, 551; 370/328, 370/331, 352, 401, 329, 338; 709/230; 340/10.1, 10.4, 10.6
 See application file for complete search history.

(56) References Cited

U.S. PATENT DOCUMENTS

| | | | |
|---|---|---|---|
| 6,707,915 B1 * | 3/2004 | Jobst et al. | 380/247 |
| 7,222,101 B2 * | 5/2007 | Bishop et al. | 705/51 |
| 7,437,567 B2 * | 10/2008 | Hollingshead | 713/186 |
| 7,657,287 B2 * | 2/2010 | Hausner et al. | 455/558 |

(Continued)

FOREIGN PATENT DOCUMENTS

| DE | 10153201 A1 | 5/2003 |
|---|---|---|
| DE | 102004056184 A1 | 5/2006 |

(Continued)

OTHER PUBLICATIONS

Machine translation of JP2002-135425, ASAZU, publication date May 2002.*

(Continued)

*Primary Examiner* — Joseph Arevalo
(74) *Attorney, Agent, or Firm* — Carlson, Gaskey & Olds, P.C.

(57) ABSTRACT

Wireless communication techniques are useful for controlling access granted by a security device (22). In a disclosed example, a communication portion (24) comprises a residential gateway that is capable of communicating with a mobile station (30) over a local network (32). The communication portion (24) is also capable of communicating with a remotely located server (40) over a secure network connection (42) such as over the internet. The mobile station (30) identifies itself to the security device (22). The mobile station identifier is verified to determine authorization to gain the requested access. The security device (22) provides the mobile station identifier to the remote server (40) which provides a security code to the mobile station (30) and a pass code to the security device (22). The security device (22) uses the pass code to verify the security code received from the mobile station (30) and controls access accordingly.

8 Claims, 1 Drawing Sheet

(56) References Cited

U.S. PATENT DOCUMENTS

| | | | |
|---|---|---|---|
| 7,778,654 B2* | 8/2010 | Ahn et al. | 455/466 |
| 7,890,427 B1* | 2/2011 | Rao et al. | 705/51 |
| 2004/0025056 A1* | 2/2004 | Katsube | 713/201 |
| 2005/0071646 A1* | 3/2005 | Hollingshead | 713/186 |
| 2005/0283618 A1* | 12/2005 | Min | 713/182 |
| 2006/0069916 A1* | 3/2006 | Jenisch et al. | 713/172 |
| 2006/0090067 A1* | 4/2006 | Edmonds et al. | 713/159 |
| 2006/0143705 A1* | 6/2006 | Sentoff | 726/19 |
| 2006/0177016 A1* | 8/2006 | Gallick et al. | 379/67.1 |
| 2006/0211448 A1* | 9/2006 | Reiss et al. | 455/553.1 |
| 2007/0021133 A1* | 1/2007 | Coulas | 455/518 |
| 2007/0124490 A1* | 5/2007 | Kalavade et al. | 709/230 |
| 2007/0143824 A1* | 6/2007 | Shahbazi | 726/1 |
| 2007/0274522 A1* | 11/2007 | Boman et al. | 380/247 |
| 2007/0287455 A1* | 12/2007 | Hsu et al. | 455/435.1 |
| 2007/0288715 A1* | 12/2007 | Boswell et al. | 711/164 |
| 2008/0016537 A1* | 1/2008 | Little et al. | 725/81 |
| 2008/0113649 A1* | 5/2008 | Ibacache et al. | 455/410 |
| 2008/0120698 A1* | 5/2008 | Ramia | 726/4 |
| 2008/0120707 A1* | 5/2008 | Ramia | 726/5 |
| 2008/0181401 A1* | 7/2008 | Picquenot et al. | 380/247 |
| 2008/0209034 A1* | 8/2008 | Shin et al. | 709/224 |
| 2008/0216153 A1* | 9/2008 | Aaltonen et al. | 726/3 |
| 2008/0304458 A1* | 12/2008 | Aghvami et al. | 370/338 |
| 2009/0088134 A1* | 4/2009 | Ishii et al. | 455/411 |
| 2009/0097459 A1* | 4/2009 | Jendbro et al. | 370/338 |
| 2009/0119754 A1* | 5/2009 | Schubert | 726/4 |

FOREIGN PATENT DOCUMENTS

| | | | | |
|---|---|---|---|---|
| JP | 2002-135425 | * | 5/2002 | H04M 3/487 |
| WO | 0035178 | | 6/2000 | |
| WO | WO 2005/125214 A2 | * | 12/2005 | H04N 7/24 |
| WO | 2006098690 A1 | | 9/2006 | |

OTHER PUBLICATIONS

Extended European Search Report for Application No. EP 07 25 0805 mail Jul. 31, 2007.

International Search Report and Written Opinion of the International Searching Authority for International application No. PCT/US2008/002303 mailed Aug. 1, 2008.

* cited by examiner

WIRELESS COMMUNICATION TECHNIQUES FOR CONTROLLING ACCESS GRANTED BY A SECURITY DEVICE

FIELD OF THE INVENTION

This invention generally relates to communication. More particularly, this invention relates to wireless communication.

DESCRIPTION OF THE RELATED ART

Wireless communication systems are well known and in widespread use. A variety of devices are available as mobile stations for wireless communications within cellular systems. Wireless service providers have attempted to provide increasingly more reliable and more versatile services. For example, the types of communications that are capable using mobile stations currently compared to even a few years ago has increased dramatically.

Those skilled in the art are always striving to make improvements and to provide additional functions or capabilities to existing customers.

SUMMARY

A disclosed example method of using wireless communication for controlling access granted by a security device includes verifying a mobile station identifier of a mobile station that provides the identifier to the security device. A security code is transmitted to the mobile station responsive to verification of the mobile station identifier. A pass code is provided to the security device for enabling the security device to grant access responsive to receiving the security code from the mobile station.

Another disclosed example method of using wireless communication for controlling access granted by a security device includes receiving a mobile station identifier from a mobile station. The mobile station identifier is then transmitted to a remote server. Upon receiving a security code from the mobile station, a determination is made whether the security code corresponds to a pass code received from the server. When there is sufficient correspondence between the security code and the pass code, access may be granted at the security device.

Another disclosed example method of using wireless communication is for obtaining access granted by a security device. A mobile station provides a mobile station identifier to the security device. A security code is received at the mobile station from a server located remotely from the security device. The mobile station transmits the security code to the security device. Access is obtained at the security device when the security code corresponds to a pass code provided by the server to the security device.

The various features and advantages of this invention will become apparent to those skilled in the art from the following detailed description. The drawings that accompany the detailed description can be briefly described as follows.

DETAILED DESCRIPTION

Figure 1:
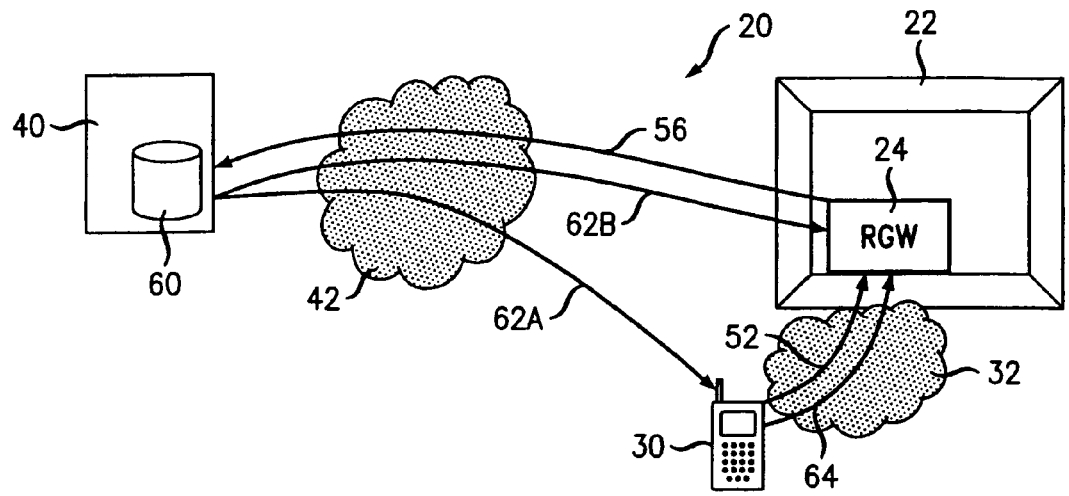
FIG. 1 schematically illustrates selected portions of a wireless communication arrangement that is useful with an embodiment of this invention.

FIG. 1 schematically shows selected portions of a wireless communication system 20 that is useful for controlling access granted by a security device 22. In one example, the security device 22 is used for controlling access to a particular location such as an entrance to a building or a particular portion of a building (such as a room or building level, for example). In another example, the security device is used for controlling access to an object such as a safe, a database or a storage unit, for example. Those skilled in the art who have the benefit of this description will realize what type of security devices will be useful in an embodiment of this invention.

The illustrated security device 22 includes a communication portion 24 that is configured to be able to communicate with a mobile station 30 such as a cell phone or a personal digital assistant. In the illustrated example, the communication portion 24 communicates with the mobile station 30 over a local wireless network 32 that becomes established between the communication portion 24 and the mobile station 30 when the mobile station 30 is within an appropriate range of the communication portion 24. In one example, the network 32 includes using local area network wireless technologies such as Bluetooth or WiFi communication techniques.

In the illustrated example, the communication portion 24 also communicates with a remotely located server 40. Such communications occur over a network 42 that may be wireless, line-based or a combination of them. In one example, the communication portion 24 comprises a residential gateway that is capable of communicating with the server 40 over a secure internet connection and capable of communicating with the mobile station 30 using wireless communication techniques.

The illustrated communication portion 24 is configured to communicate using one protocol while communicating with the mobile station 30 and using another, different protocol for communicating with the server 40. Given this description, those skilled in the art will be able to select from among known protocols and communication techniques to meet the needs of their particular situation.

Figure 2:
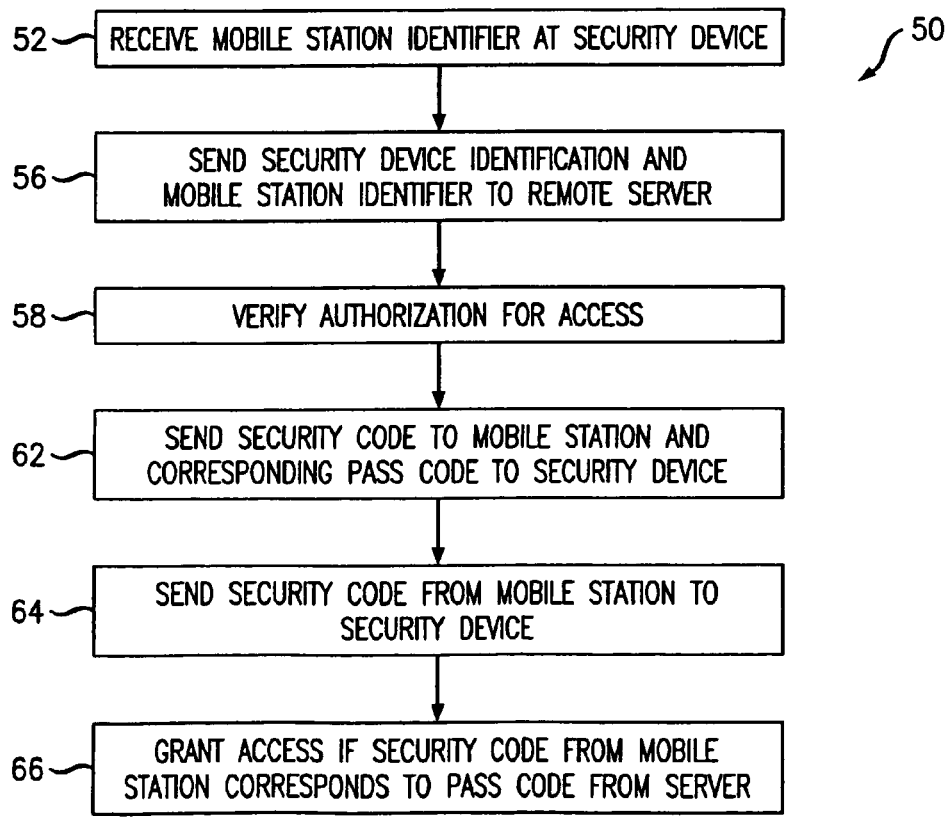
FIG. 2 is a flowchart diagram summarizing one example approach.

The illustrated example allows an individual having the mobile station 30 to gain access provided by the security device 22 by using the mobile station 30. FIG. 2 includes a flowchart diagram 50 summarizing one example approach. At 52, the security device 22 receives a mobile station identifier from the mobile station 30. In one example, whenever the mobile station moves within a selected vicinity of the security device 22 (or at least the communication portion 24), the mobile station 30 identifies itself to the communication portion 24. In some examples, from that moment forward, the local network 32 exists between the mobile station 30 and the communication portion 24.

When the security device 22 determines that an individual desires the access that is controlled by the security device 22, the communication portion 24 sends a security device identification and the mobile station identifier to the remote server 40 as schematically shown at 56 in FIGS. 1 and 2. The security device identification is useful in situations where the server 40 communicates with multiple security devices and allows the server 40 to determine from which security device the information was received.

In one example, detecting the presence of the mobile station 30 and obtaining the mobile station identifier is automatically considered a request for access by the security device 22. In another example, the individual in possession of the mobile device 30 manually manipulates the mobile station 30 (e.g., makes a menu selection or presses an appropriate pattern of keys) to cause a signal to be transmitted to the security device 22 indicating the desired access. The latter example is particularly useful where the security device 22 is responsible for controlling access to more than one location or item.

In order for access to be granted, the mobile station identifier must be verified to be an authorized identifier. In the illustrated example, the server 40 includes a database 60 containing a list of authorized mobile station identifiers. In this example, the server 40 verifies authorization for access based on the mobile station identifier as shown at 58 in FIG. 2. In another example, the security device 22 includes a database containing authorized mobile station identifiers. In such an example, the security device 22 makes the determination regarding the authorization for the particular mobile station identifier. Another example includes using a database at each of the security device 22 and the server 40.

Authorization in one example is based upon at least one access credential associated with the mobile station identifier. Example access credentials include entry in the database 60, an indication of a level or type of authorized access, an indication of particular security devices through which access is authorized or another criteria that meets the needs of a particular situation. Example access criteria include the time of day, the number of attempted accesses within a certain time period, an amount of time between accesses, security guard roster information, a sequence of accesses to a number of security devices (e.g., a security guard making rounds to several security devices, which may depend on time of day, day of week, etc.) or a number of users involved in the requested access (e.g., a requirement for simultaneous attempted access by at least two individuals). Such access criteria may be stored in the database 60 in association with an entry regarding each mobile station identifier, for example. In one example, the server 40 determines whether the circumstances associated with the requested access matches at least one access criteria associated with a particular mobile station identifier for determining whether the requested access will be granted.

In the event that the mobile station identifier is not authorized for the requested access, a message may be provided to the mobile station 30 by the communication portion 24 or the server 40 indicating that access will not be granted.

In the event that the mobile station identifier is authorized for access, the server 40 sends a security code directly to the mobile station 30 and sends a pass code to the security device 22. This is shown schematically at 62 in FIG. 2 and 62A and 62B, respectively, in FIG. 1. In one example, the server 40 uses a first protocol for communicating with the mobile station 30 and a second, different protocol for communicating with the security device 22.

In one example, the mobile station identifier comprises an international mobile equipment identity (IMEI). In another example, the mobile station identifier comprises an international mobile subscriber identity (IMSI). In the case of an IMEI, it may be possible for a variety of individuals to use the mobile station 30 to gain access through the security device 22. In the case of an IMSI, an individual may be able to use different mobile stations provided that they use the same SIM card having the associated IMSI or otherwise have the same IMSI as when they were authorized for access. Given this description, those skilled in the art will realize how best to select a mobile station identifier for purposes of interacting with a security device to control access provided by that security device.

In one example, the security code is provided to the mobile station 30 using a short message service (SMS) message that is sent to the mobile station 30. In one example, the SMS message indicates the security code to an individual who then manually manipulates the mobile station 30 to provide that security code to the communication portion 24 of the security device 22. In another example, the SMS message indicates that the security code has been received at the mobile station 30 without revealing the exact security code. The individual then can manually manipulate the mobile station 30 (e.g., by pressing an appropriate button or making a menu selection) and the mobile station 30 forwards the security code to the communication portion 24. In one example, entering the security code is based upon a Bluetooth pairing request that is provided to the communication portion 24 over the local network 32. Sending the security code to the communication portion 24 is schematically shown at 64 in FIGS. 1 and 2.

The security device 22 determines whether the security code received from the mobile station 30 corresponds to the pass code received from the server 40. If there is appropriate correspondence, the security device 22 grants the requested access. If there is not sufficient correspondence, the access request will be denied.

In one example, there is a limited time within which the security code must be transmitted from the mobile station 30 to the communication portion 24. Providing a limited time window for such communication enhances security as may be needed for particular situations. In one example, the security device 22 includes a timer that controls the amount of time within which the security code must be received from the mobile station 30. In one such example, the timer is initialized upon receipt of the pass code from the server 40. In another example, a communication from the server 40 indicates the expiration of the time within which the security code must be received for the desired access to be granted. Some examples include providing such timing information in a SMS message sent to the mobile station 30 to notify a user of the time limit.

One advantage of the disclosed examples is that they allow for a mobile station to be used for yet another purpose beyond the cell phone communications that it is already capable of handling. This reduces the need to provide specific security cards or pass keys to a variety of individuals who may need access through the security device 22, for example. Another advantage is allowing for controlling access through a security device by using a centralized server, which allows for updating database information regarding authorized individuals, for example, without requiring a visit to the location of one or more security devices.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of using wireless communication for controlling access granted by a security device, the method comprising:
    verifying a mobile station identifier of a mobile station that provided the mobile station identifier to the security device;

transmitting a security code to the mobile station responsive to verifying the mobile station identifier;

providing a pass code to the security device for enabling the security device to grant access responsive to receiving the security code from the mobile station; and limiting an amount of time within which the security code will be accepted by the security device from the mobile station.

2. A method of using wireless communication for controlling access granted by a security device, the method comprising:

verifying a mobile station identifier of a mobile station that provided the mobile station identifier to the security device;

transmitting a security code to the mobile station responsive to verifying the mobile station identifier;

providing a pass code to the security device for enabling the security device to grant access responsive to receiving the security code from the mobile station; and transmitting a short message service communication to the mobile station that indicates the security code.

3. A method of using wireless communication for obtaining access granted by a security device, the method comprising:

providing a mobile station identifier from a mobile station to the security device;

receiving a security code at the mobile station from a server located remotely from the security device;

transmitting the security code to the security device for obtaining access at the security device when the security code corresponds to a pass code provided by the server to the security device; and receiving an indication corresponding to the security code in a short message service message from the server.

4. A method of using wireless communication for obtaining access granted by a security device, the method comprising:

providing a mobile station identifier from a mobile station to the security device;

receiving a security code at the mobile station from a server located remotely from the security device; and transmitting the security code to the security device for obtaining access at the security device when the security code corresponds to a pass code provided by the server to the security device, wherein the mobile station identifier comprises at least one of an International Mobile Equipment Identity or an International Mobile Subscriber Identity.

5. A method of using wireless communication for obtaining access granted by a security device, the method comprising:

providing a mobile station identifier from a mobile station to the security device;

receiving a security code at the mobile station from a server located remotely from the security device; and transmitting the security code to the security device for obtaining access at the security device when the security code corresponds to a pass code provided by the server to the security device, wherein the access is to at least one of a building or object that is distinct from the mobile station.

6. A method of using wireless communication for controlling access granted by a security device, the method comprising:

receiving a mobile station identifier from a mobile station;

transmitting the received mobile station identifier to a remote server;

receiving a security code from the mobile station;

receiving a pass code from the server;

granting access at the security device when the security code received from the mobile station corresponds to the pass code received from the server; and limiting an amount of time within which the security code will be accepted by the security device from the mobile station.

7. A method of using wireless communication for controlling access granted by a security device, the method comprising:

receiving a mobile station identifier from a mobile station;

transmitting the received mobile station identifier to a remote server;

receiving a security code from the mobile station;

receiving a pass code from the server;

granting access at the security device when the security code received from the mobile station corresponds to the pass code received from the server, wherein the access is to at least one of a building or an object distinct from the mobile station.

8. A method of using wireless communication for controlling access granted by a security device, the method comprising:

verifying a mobile station identifier of a mobile station that provided the mobile station identifier to the security device;

transmitting a security code to the mobile station responsive to verifying the mobile station identifier;

providing a pass code to the security device for enabling the security device to grant access responsive to receiving the security code from the mobile station, wherein the access is to at least one of a building or an object distinct from the mobile station.

* * * * *